(12) United States Patent
Steinle et al.

(10) Patent No.: US 10,621,736 B2
(45) Date of Patent: Apr. 14, 2020

(54) METHOD AND SYSTEM FOR REGISTERING A PATIENT WITH A 3D IMAGE USING A ROBOT

(71) Applicant: Brainlab AG, Munich (DE)

(72) Inventors: Wolfgang Steinle, Munich (DE); Christoffer Hamilton, Aschheim (DE); Nils Frielinghaus, Heimstetten (DE)

(73) Assignee: BRAINLAB AG, Munich (DE)

( * ) Notice: Subject to any disclaimer, the term of this patent is extended or adjusted under 35 U.S.C. 154(b) by 115 days.

(21) Appl. No.: 16/073,137

(22) PCT Filed: Feb. 12, 2016

(86) PCT No.: PCT/EP2016/052951
§ 371 (c)(1),
(2) Date: Jul. 26, 2018

(87) PCT Pub. No.: WO2017/137087
PCT Pub. Date: Aug. 17, 2017

(65) Prior Publication Data
US 2019/0005661 A1 Jan. 3, 2019

(51) Int. Cl.
*G06T 7/33* (2017.01)
*B25J 9/16* (2006.01)

(52) U.S. Cl.
CPC ............... *G06T 7/337* (2017.01); *G06T 7/33* (2017.01); *B25J 9/1697* (2013.01); *G06T 2200/04* (2013.01)

(58) Field of Classification Search
CPC ....... G06T 7/337; G06T 7/33; G06T 2200/04; B25J 9/1697
See application file for complete search history.

(56) References Cited

U.S. PATENT DOCUMENTS

| 6,033,415 A | 3/2000 | Mittelstadt et al. |
| 6,167,145 A | 12/2000 | Foley et al. |

(Continued)

FOREIGN PATENT DOCUMENTS

| EP | 1857070 A1 | 11/2007 |
| WO | WO9836371 A1 | 8/1998 |

OTHER PUBLICATIONS

International Search Report and Written Opinion issued in Application No. PCT/EP2016/052951 dated Oct. 18, 2016.

(Continued)

*Primary Examiner* — David F Dunphy
(74) *Attorney, Agent, or Firm* — Middleton Reutlinger

(57) ABSTRACT

A method of operating a medical registration system, the medical registration system comprising a robot which carries a surface point sampling device and comprising a computer connected to the robot, to obtain a registration of a 3D image of a patient with the patient (P) by: a) acquiring the 3D image of the patient; b) acquiring an initial registration of the 3D image with the patient as the registration; c) instructing the robot to sample the spatial locations of N different points on the surface of the patient using the surface point sampling device, wherein N is a positive integer; d) updating the registration based on the spatial locations of the N sampled points; and e) repeating steps c) and d) until a predetermined exit condition is fulfilled.

15 Claims, 3 Drawing Sheets

(56) References Cited

U.S. PATENT DOCUMENTS

| | | | | |
|---|---|---|---|---|
| 2005/0089213 A1* | 4/2005 | Geng | ................ | G06K 9/00214 |
| | | | | 382/154 |
| 2009/0316966 A1* | 12/2009 | Marshall | .............. | A61B 6/5217 |
| | | | | 382/128 |
| 2014/0278232 A1 | 9/2014 | Miller et al. | | |
| 2018/0071032 A1* | 3/2018 | de Almeida Barreto | .................... | |
| | | | | G06T 7/50 |

OTHER PUBLICATIONS

Lavallee et al. "Computer-Assisted Spine Surgery: A Technique for Accurate Transpedicular Screw Fixation Using CT Data and a 3-D Opitical Localizer" Journal of Image Guided Surgery. vol. 1, No. 1. 1995.

Colchester "Development and Preliminary Evaluation of VISLAN, A Surgical Planning and Guidance System Using Intra-Operative Video Imaging" Medical Image Analysis. vol. 1, No. 1. 1996.

* cited by examiner

METHOD AND SYSTEM FOR REGISTERING A PATIENT WITH A 3D IMAGE USING A ROBOT

TECHNICAL FIELD

The present invention relates to a computer implemented method for obtaining a registration of a 3D image of a patient with the patient and to a corresponding computer program and system.

SUMMARY

Many medical applications require a registration of a patient with a 3D image of the patient. The registration in this context does for example mean to adapt the 3D image so as to correspond to the surface of the patient. The 3D image of the patient thus represents at least a part of the shape of the patient, that is the surface or outer contour of the patient. The 3D image can for example be a 3D array of voxels which represent the surface of the patient or a set of locations of points which represent the surface of the patient.

In general, the 3D image is obtained at a first point in time, for example before a treatment of the patient. The registration of the patient with the 3D image of the patient typically happens at a second point in time later than the first point in time, for example during or immediately before a treatment of the patient. The registration typically involves obtaining a set of samples representing the spatial locations of points on the surface of the patient and matching the 3D image to the set of samples, for example by rigid or elastic fusion.

In general, surface registration is a cumbersome procedure for the user because it takes quite some time to acquire enough and suitable points for surface matching. In addition, the quality of the sampled points is often sub-optimal because not enough points are sampled or points are sampled at locations which are not contributing to the improvement of the registration.

The purpose of the present invention is to improve the registration process by utilizing a robot.

The method, the program and the system are defined by the appended independent claims. Advantages, advantageous features, advantageous embodiments and advantageous aspects of the present invention are disclosed in the following and contained in the subject-matter of the dependent claims. Different advantageous features can be combined in accordance with the invention wherever technically expedient and feasible. Specifically, a feature of one embodiment which has the same or a similar function to another feature of another embodiment can be exchanged with said other feature, and a feature of one embodiment which adds an additional function to another embodiment can in particular be added to said other embodiment.

The present invention relates to a method of operating a medical registration system, the medical registration system comprising a robot which carries a surface point sampling device and comprising a computer connected to the robot, to obtain a registration of a 3D image of a patient with the patient.

The method involves a first step of acquiring the 3D image of the patient. As explained above, the 3D image represents at least a part of the surface of the patient, for example as a 3D array of voxels or a set of locations of points on the surface.

The method further involves a second step of acquiring an initial registration of the 3D image with the patient as the registration. The initial registration can be calculated by any suitable approach, such as an approach using landmarks, a new 3D image of the patient, for example captured using the time-of-flight camera or a stereoscopic camera, or a (small) set of sampled points on the surface of the patient.

The method further involves a third step of instructing the robot to sample the spatial locations of N different points on the surface of the patient using the surface sampling device, wherein N is a positive integer. This means that N is 1, 2, 3 or more. The result of this third step is a set of N sample points, which means a set of N spatial locations.

The method further involves a fourth step of updating the registration based on the spatial locations of the N sampled points, which are the N sampled points which were sampled in the third step. Updating the registration can mean the calculation of a completely new registration based on the N sampled points sampled in the third step and any sampled points sampled previously, for example in a previous iteration of the method, or an amendment of the registration considering the N sampled points.

The method further involves a fifth step of repeating the third step of instructing the robot to sample the spatial locations of N different points and the fourth step of updating the registration until a predetermined exit condition is fulfilled. This means that the present method iterates through the third and fourth steps at least twice or more. It shall be noted that the number N of sampled points can vary in every iteration.

The iterative approach according to the present invention allows to evaluate the registration after each iteration and to select the surface point to be sampled in the next iteration accordingly, for example in order to increase the accuracy and/or reliability of the registration. Since there is the initial registration or the registration after a completed iteration of the method, an approximate topography of the patient's surface is known, such that the approximate spatial locations of the points to be sampled are known. A surface point can then be expected at or near the approximate spatial location. The exact spatial location can then be sampled.

There are many approaches for sampling spatial locations of points on the surface of a patient. They can basically be divided into contact-based and contactless approaches. In a contact-based approach, a probe approaches the surface of the patient until it is in contact and the location of the point of the probe which contacts the surface is determined as the spatial location of the sampled point. The probe is approached towards the surface by the robot. The spatial location of the probe can be obtained from the pose of the robot, a marker device attached to the probe or to the robot or any other suitable technique. The contact of the probe and the surface can for example be determined by a sensor in the probe or a sensor in the robot. The sensor is for example a pressure sensor.

One contactless approach involves a light beam such as a laser beam, which is generated by a light beam generator and directed towards the surface of the patient. In one example, the spatial location at which the light beam hits the surface of the patient is determined from a stereoscopic image which shows the light beam on the surface of the patient. Such a system is known as Z-Touch® of the applicant. In such a system, a marker can optionally be attached to the surface point sampling device such that it can be tracked.

In another example, the light beam source carries a marker device and comprises a range finder which determines the distance between the light beam generator and the light spot on the surface of the patient. The spatial location of the sampled point is then determined from the spatial position of the marker device attached to the light beam source, the orientation of the light beam relative to the marker device and the distance between the light beam source and the light spot on the surface of the patient.

In one embodiment, the exit condition of the fifth step is at least one of a time lapse, the total number of sampled surface points, the accuracy of the registration or the registration confidence. A time lapse means that a predetermined amount of time is budgeted for the registration process, in particular for the sampling process. Once the budgeted amount of time is consumed, the workflow ends. This means for example that the current iteration continues until the N point are sampled, but no new iteration is started.

The total number of sampled surface points means the number of sampled surface points over all iterations of the method.

The accuracy of the registration describes how accurately the sampled points match the registered 3D image. One possible metric for determining the accuracy of the registration is a root mean square of the distances of the sampled points to the registered 3D image. The distance of a sampled point to the surface as represented by the registered 3D image is for example the shortest possible distance of the sampled point to the 3D surface. The surface as represented by the registered 3D image is also referred to as registered 3D surface.

The registration confidence for example identifies the probability that the found registration is the best possible registration. The registration confidence can have at least the two following aspects. Those aspects are based on the fact that different registrations have different accuracies, for example different root mean squares of the distances between the sampled points and the registered 3D surface as explained above. This means that a plurality of registrations results in an error function which associates a registration with an accuracy. The best possible registration is the one corresponding to the global minimum of the error function.

In one aspect of the registration confidence, the relation between the accuracy of the best registration, that is the one with the global minimum of the error function, and the accuracy of the second best registration, that is the registration with the lowest local minimum of the error function which is not the global minimum, fulfills a predetermined criterion, such as a predetermined relative or absolute difference.

In another aspect, the error function of the registration shall have a sharp minimum, which means that the accuracy of a registration close to the best registration is significantly lower than the accuracy of the best registration.

In one embodiment, sampling the spatial location of a surface point in the third step involves moving, by the robot, the surface point sampling device towards the surface of the patient until it is in contact therewith as explained above. This is performed for each of the N different points. The surface point sampling device is for example moved perpendicularly towards the surface at the point to be sampled, wherein the orientation of the surface at the point to be sampled is determined from the registered 3D image, i.e. the approximate topography.

In one embodiment, the third step of instructing the robot to sample the spatial locations of N different points involves, for each of the N different points, instructing the robot to move the surface point sampling device into a sampling position and instructing the surface point sampling device to sample a surface point. This relates to a contactless technique as explained above. In this embodiment, sampling a surface point for example involves determining the distance from the sampled surface point to the surface point sampling device and calculating the spatial location of the surface point from said distance and the sampling position of the surface point sampling device as explained above. In another example, this involves creating a light spot on the surface of the patient and determining the spatial location of the light spot as the spatial location of the surface point.

Within each iteration, the robot consecutively moves the surface point sampling device into N sampling positions. It is not necessary to stop the surface point sampling device at the sampling position for the sampling operation. It is also possible to sample a surface point during a motion of the surface point sampling device, but when it is at or near the corresponding sampling position. However, the robot can be controlled such that the speed of the surface point sampling device at a sampling position is below a predetermined threshold. This improves the accuracy of the sampled spatial location of the sampled point. However, it is of course possible to stop the surface point sampling device at a sampling position for sampling a surface point.

In one embodiment, the sampling position is a position in which at least one of the distance or the orientation between the surface point sampling device and the surface of the patient is within a predetermined range. This leads to a shape and/or size of the light spot on the patient's surface which is easily and/or exactly recognizable, for example using a stereoscopic camera.

In one embodiment, the sampling position is a position in which a marker device attached to the robot or the surface point sampling device is within a predetermined range relative to a medical tracking system, for example relative to a stereoscopic camera of the medical tracking system. This means that the position of the marker device can be ascertained by the medical tracking system, either at all or with a certain accuracy.

An advantage of using a robot for sampling surface points is that surface points can be sampled even if the marker device is not within the field-of-view of the medical tracking system. In this case, the position of the surface point sampling device, when a surface point is sampled, can be determined from the last position of the surface point sampling device measured by the medical tracking system and the movement of the robot since then. This applies to both contact-based and contactless techniques.

In one embodiment, the sampling position depends on the surface point to be sampled. As explained above, the approximate topography of the patient's surface is known from the latest registration of the 3D image. This means that the approximate location of a surface point to be sampled is known. In this embodiment, the sampling position is preferably optimized for the approximate spatial location of the point to be sampled.

An important aspect of the present invention relates to planning the surface points to be sampled in an iteration of the method. The iterative approach of the present invention allows for an optimized planning, for example in teams of the total number of surface points to be sampled for a reliable fusion of the 3D image, and therefore the amount of time required for the sampling process.

In one embodiment, a surface point to be sampled is determined based on the registered 3D image or a registered atlas. The registered 3D image or the registered atlas represents an approximate topology of the patient's surface, such that the complexity of particular areas of the patient's surface can be determined from the registered 3D image or the registered atlas and the number of surface points to be sampled in a certain area of the patient's surface can for example correlate with the complexity of this area. The more complex the area is, the higher becomes the number of points to be sampled in this area.

In one embodiment, a surface point to be sampled is determined based on a registered atlas and the atlas defines the number of points to be sampled in a predefined area of the surface. This means that the number of points to be sampled for a particular area is not calculated on the fly, but is pre-stored in the atlas or along with the atlas.

In one embodiment, a surface point to be sampled is a point in an area of the surface with a high curvature or comprising a saddle point. A high curvature means a curvature above a predetermined threshold.

In another embodiment, a surface point to be sampled is a point with a maximum distance to the other surface points sampled so far, which means all surface points sampled so far or the surface points sampled so far in the current iteration of the method. This embodiment assures that a large area of the patient's surface is sampled with a small number of sampled points.

In one embodiment, a surface point to be sampled is determined based on a co-registered optical image of the patient. This means that an optical image of the patient is acquired. The optical image of the patient can be a 2D image or a 3D image. The optical image is for example captured by a video camera. The optical image being co-registered means that the viewing direction of the optical image relative to the patient and/or the registered 3D image is determined.

In this embodiment, it is for example possible to identify parts of the co-registered optical image which do not show the surface of the patient. It is for example possible to identify areas of the surface which are covered by objects such as draping, tubing etc. It does not make sense to sample a point on the surface of such an object, such that for example areas not to be sampled can be determined from the co-registered optical image.

In one embodiment, the surface points to be sampled are selected such that the robot remains in one or more safe working areas. A safe working area is a spatial area in which the robot can move without the risk of colliding with an object or a person. Safe working areas are for example predefined and stored in the computer. In an optional addition to this embodiment, the computer controls the robot such that it remains in one or more safe working areas while it moves the surface point sampling device from one sampling position into another sampling position.

In one embodiment, the third step involves trajectory planning of the surface point sampling device. Trajectory planning for example optimizes the order in which the N surface points are sampled such that the time required for moving the surface point sampling device into all N sampling positions and/or the length of the trajectory are minimized.

The present invention further relates to a program which, when running on a computer, causes the computer to perform the method as explained above and/or to program a storage medium on which the program is stored, in particular in a non-transitory form.

The present invention further relates to a computer on which the aforementioned program is stored and/or run and to a medical registration system comprising the aforementioned computer, a robot and a surface point sampling device attached to the robot.

DEFINITIONS

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is an augmented reality device (also referred to as augmented reality glasses) which can be used as "goggles" for navigating. A specific example of such augmented reality glasses is Google Glass (a trademark of Google, Inc.). An augmented reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. The monitor may also be the monitor of a portable, for example handheld, device such as a smart phone or personal digital assistant or digital media player.

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing the data by means of a computer and for example within the framework of the method in accordance with the invention. The meaning of "acquiring data" also for example encompasses the scenario in which the data are received or retrieved by the computer implemented method or program, for example from another program, a previous method step or a data storage medium, for example for further processing by the computer implemented method or program. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

The invention also relates to a program which, when running on a computer, causes the computer to perform one or more or all of the method steps described herein and/or to a program storage medium on which the program is stored (in particular in a non-transitory form) and/or to a computer comprising said program storage medium and/or to a (physical, for example electrical, for example technically generated) signal wave, for example a digital signal wave, carrying information which represents the program, for example the aforementioned program, which for example comprises code means which are adapted to perform any or all of the method steps described herein.

Within the framework of the invention, computer program elements can be embodied by hardware and/or software (this includes firmware, resident software, micro-code, etc.). Within the framework of the invention, computer program elements can take the fonii of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

It is the function of a marker to be detected by a marker detection device (for example, a camera or an ultrasound receiver or analytical devices such as CT or MRI devices) in such a way that its spatial position (i.e. its spatial location and/or alignment) can be ascertained. The detection device is for example part of a navigation system. The markers can be active markers. An active marker can for example emit electromagnetic radiation and/or waves which can be in the infrared, visible and/or ultraviolet spectral range. A marker can also however be passive, i.e. can for example reflect electromagnetic radiation in the infrared, visible and/or ultraviolet spectral range or can block x-ray radiation. To this end, the marker can be provided with a surface which has corresponding reflective properties or can be made of metal in order to block the x-ray radiation. It is also possible for a marker to reflect and/or emit electromagnetic radiation and/or waves in the radio frequency range or at ultrasound wavelengths. A marker preferably has a spherical and/or spheroid shape and can therefore be referred to as a marker sphere; markers can however also exhibit a cornered, for example cubic, shape.

A marker device can for example be a reference star or a pointer or a single marker or a plurality of (individual) markers which are then preferably in a predetermined spatial relationship. A marker device comprises one, two, three or more markers, wherein two or more such markers are in a predetermined spatial relationship. This predetermined spatial relationship is for example known to a navigation system and is for example stored in a computer of the navigation system.

In another embodiment, a marker device comprises an optical pattern, for example on a two-dimensional surface. The optical pattern might comprise a plurality of geometric shapes like circles, rectangles and/or triangles. The optical pattern can be identified in an image captured by a camera, and the position of the marker device relative to the camera can be determined from the size of the pattern in the image, the orientation of the pattern in the image and the distortion of the pattern in the image. This allows to determine the relative position in up to three rotational dimensions and up to three translational dimensions from a single two-dimensional image.

A navigation system, such as a surgical or medical navigation system, is understood to mean a system which can comprise: at least one marker device; a transmitter which emits electromagnetic waves and/or radiation and/or ultrasound waves; a receiver which receives electromagnetic waves and/or radiation and/or ultrasound waves; and an electronic data processing device which is connected to the receiver and/or the transmitter, wherein the data processing device (for example, a computer) for example comprises a processor (CPU) and a working memory and advantageously an indicating device for issuing an indication signal (for example, a visual indicating device such as a monitor and/or an audio indicating device such as a loudspeaker and/or a tactile indicating device such as a vibrator) and a permanent data memory, wherein the data processing device processes navigation data forwarded to it by the receiver and can advantageously output guidance information to a user via the indicating device. The navigation data can be stored in the permanent data memory and for example compared with data stored in said memory beforehand.

A landmark is a defined element of an anatomical body part which is always identical or recurs with a high degree of similarity in the same anatomical body part of multiple patients. Typical landmarks are for example the epicondyles of a femoral bone or the tips of the transverse processes and/or dorsal process of a vertebra. The points (main points or auxiliary points) can represent such landmarks. A landmark which lies on (for example on the surface of) a characteristic anatomical structure of the body part can also represent said structure. The landmark can represent the anatomical structure as a whole or only a point or part of it. A landmark can also for example lie on the anatomical structure, which is for example a prominent structure. An example of such an anatomical structure is the posterior aspect of the iliac crest. Another example of a landmark is one defined by the rim of the acetabulum, for instance by the centre of said rim. In another example, a landmark represents the bottom or deepest point of an acetabulum, which is derived from a multitude of detection points. Thus, one landmark can for example represent a multitude of detection points. As mentioned above, a landmark can represent an anatomical characteristic which is defined on the basis of a characteristic structure of the body part. Additionally, a landmark can also represent an anatomical characteristic defined by a relative movement of two body parts, such as the rotational centre of the femur when moved relative to the acetabulum.

Preferably, an atlas describes (for example defines, more particularly represents and/or is) a general three-dimensional shape of an anatomical body part. The atlas therefore represents an atlas of the anatomical body part. An atlas typically consists of a plurality of generic models of objects, wherein the generic models of the objects together form a complex structure. For example, the atlas constitutes a statistical model of a patient's body (for example, a part of the body) which has been generated from anatomic information gathered from a plurality of human bodies, for example from medical image data containing images of such human bodies. In principle, the atlas therefore represents the result of a statistical analysis of such medical image data for a plurality of human bodies. This result can be output as an image—the atlas therefore contains or is comparable to medical image data. Such a comparison can be carried out for example by applying an image fusion algorithm which conducts an image fusion between the atlas data and the medical image data. The result of the comparison can be a measure of similarity between the atlas data and the medical image data.

The human bodies, the anatomy of which serves as an input for generating the atlas, advantageously share a common feature such as at least one of gender, age, ethnicity, body measurements (e.g. size and/or mass) and pathologic state. The anatomic information describes for example the anatomy of the human bodies and is extracted for example from medical image information about the human bodies. The atlas of a femur, for example, can comprise the head, the neck, the body, the greater trochanter, the lesser trochanter and the lower extremity as objects which together make up the complete structure.

Image fusion can be elastic image fusion or rigid image fusion. In the case of rigid image fusion, the relative position between the pixels of a 2D image and/or voxels of a 3D image is fixed, while in the case of elastic image fusion, the relative positions are allowed to change.

In this application, the term "image morphing" is also used as an alternative to the term "elastic image fusion", but with the same meaning.

Elastic fusion transformations (for example, elastic image fusion transformations) are for example designed to enable a seamless transition from one dataset (for example a first dataset such as for example a first image) to another dataset (for example a second dataset such as for example a second image). The transformation is for example designed such that one of the first and second datasets (images) is deformed, for example in such a way that corresponding structures (for example, corresponding image elements) are arranged at the same position as in the other of the first and second images. The deformed (transformed) image which is transformed from one of the first and second images is for example as similar as possible to the other of the first and second images. Preferably, (numerical) optimization algorithms are applied in order to find the transformation which results in an optimum degree of similarity. The degree of similarity is preferably measured by way of a measure of similarity (also referred to in the following as a "similarity measure"). The parameters of the optimization algorithm are for example vectors of a deformation field. These vectors are determined by the optimization algorithm in such a way as to result in an optimum degree of similarity. Thus, the optimum degree of similarity represents a condition, for example a constraint, for the optimization algorithm. The bases of the vectors lie for example at voxel positions of one of the first and second images which is to be transformed, and the tips of the vectors lie at the corresponding voxel positions in the transformed image. A plurality of these vectors is preferably provided, for instance more than twenty or a hundred or a thousand or ten thousand, etc. Preferably, there are (other) constraints on the transformation (deformation), for example in order to avoid pathological deformations (for instance, all the voxels being shifted to the same position by the transformation). These constraints include for example the constraint that the transformation is regular, which for example means that a Jacobian determinant calculated from a matrix of the deformation field (for example, the vector field) is larger than zero, and also the constraint that the transformed (deformed) image is not self-intersecting and for example that the transformed (deformed) image does not comprise faults and/or ruptures. The constraints include for example the constraint that if a regular grid is transformed simultaneously with the image and in a corresponding manner, the grid is not allowed to interfold at any of its locations. The optimising problem is for example solved iteratively, for example by means of an optimization algorithm which is for example a first-order optimization algorithm, such as a gradient descent algorithm. Other examples of optimization algorithms include optimization algorithms which do not use derivations, such as the downhill simplex algorithm, or algorithms which use higher-order derivatives such as Newton-like algorithms. The optimization algorithm preferably performs a local optimization. If there is a plurality of local optima, global algorithms such as simulated annealing or generic algorithms can be used. In the case of linear optimization problems, the simplex method can for instance be used.

In the steps of the optimization algorithms, the voxels are for example shifted by a magnitude in a direction such that the degree of similarity is increased. This magnitude is preferably less than a predefined limit, for instance less than one tenth or one hundredth or one thousandth of the diameter of the image, and for example about equal to or less than the distance between neighbouring voxels. Large deformations can be implemented, for example due to a high number of (iteration) steps.

The determined elastic fusion transformation can for example be used to determine a degree of similarity (or similarity measure, see above) between the first and second datasets (first and second images). To this end, the deviation between the elastic fusion transformation and an identity transformation is determined. The degree of deviation can for instance be calculated by determining the difference between the determinant of the elastic fusion transformation and the identity transformation. The higher the deviation, the lower the similarity, hence the degree of deviation can be used to determine a measure of similarity.

A measure of similarity can for example be determined on the basis of a determined correlation between the first and second datasets.

In particular, the invention does not involve or in particular comprise or encompass an invasive step which would represent a substantial physical interference with the body requiring professional medical expertise to be carried out and entailing a substantial health risk even when carried out with the required professional care and expertise. For example, the invention does not comprise a step of positioning a medical implant in order to fasten it to an anatomical structure or a step of fastening the medical implant to the anatomical structure or a step of preparing the anatomical structure for having the medical implant fastened to it. More particularly, the invention does not involve or in particular comprise or encompass any surgical or therapeutic activity. The invention is instead directed as applicable to positioning a tool relative to the medical implant, which may be outside the patient's body. For this reason alone, no surgical or therapeutic activity and in particular no surgical or therapeutic step is necessitated or implied by carrying out the invention.

The invention can be used for cranial, ENT, spinal and orthopedic image-guided surgery products, in particular those of the applicant. The z-Touch® laser registration system of the cranial and ENT navigation system of the applicant is considered as a unique registration method in the neurosurgery domain because no dedicated navigation scan has to be perfotined and the existing optical tracking system can be used to record the surface points. Still, some users find the registration procedure cumbersome because it is pretty hard for the software to convey information to the user on where to scan the surface in order to optimize the surface matching result. By automatically sampling these points with the help of a robotic system, the user is not only relieved from this activity but also improved and more consistent registration results can be obtained by having the robot acquire points until a satisfactory result is achieved. By having the robotic system handle the z-Touch® acquisition device, optimal attributes regarding movement speed, distance to surface and angulation towards the tracking system can be ensured which are tough to guarantee when handling the device manually. The doctor or technician is thus relieved from an activity which is often considered to be the most complex and error prone step in the use of a surgical navigation system. This invention is especially relevant if the robotic system is also used for subsequent steps of the surgery because in this context there is no extra effort involved for having to put the robotic system in place. By maximizing the usage spectrum of a robotic system, the overall investment in such a system can be better justified.

BRIEF DESCRIPTION OF DRAWINGS

In the following, the invention is described with reference to the enclosed figures which represent preferred embodiments of the invention. The scope of the invention is not however limited to the specific features disclosed in the figures, which show.

DETAILED DESCRIPTION

Figure 1:
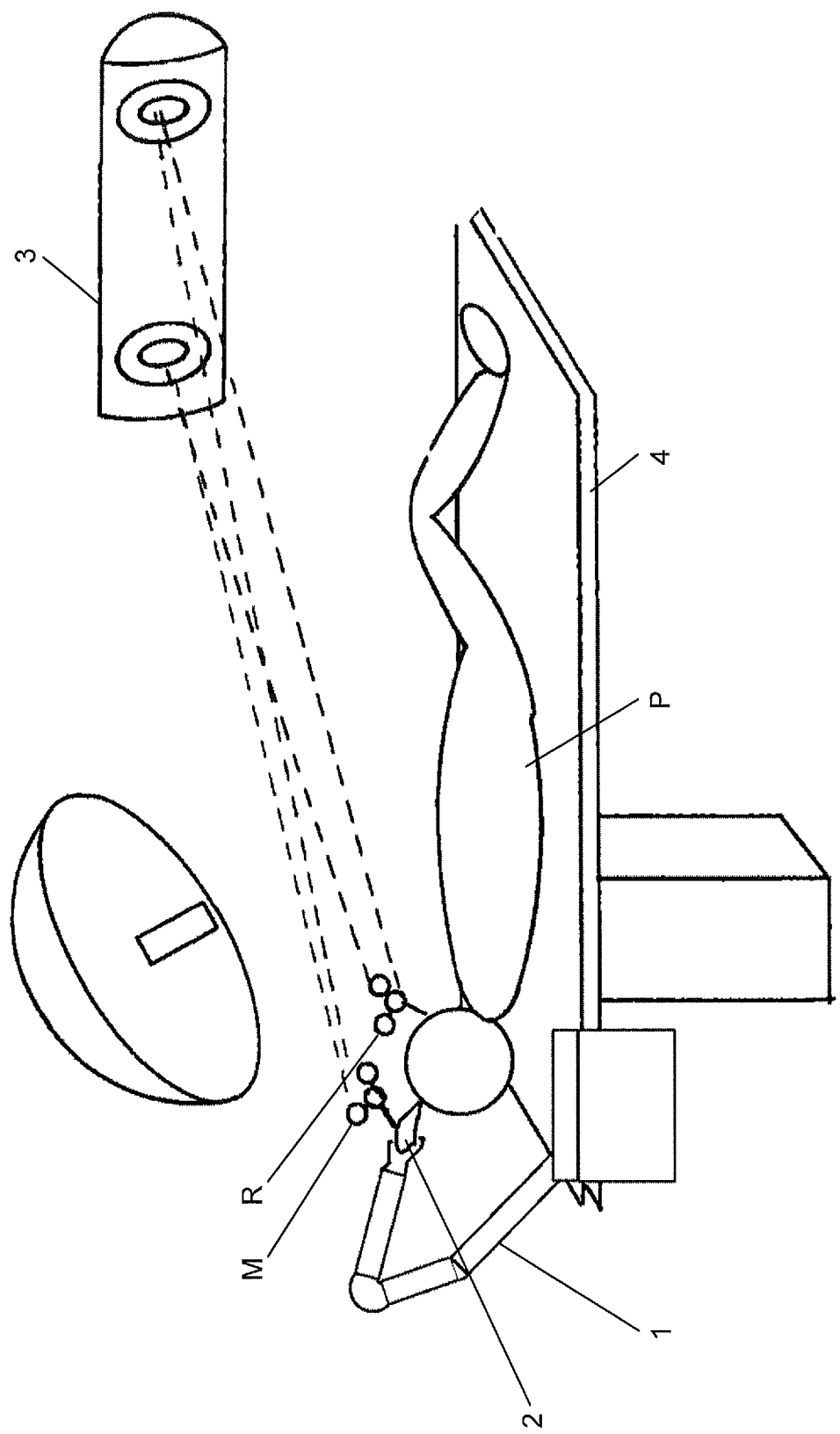
FIG. 1 a scenario with a patient to be registered.

FIG. 1 shows a scenario with a patient P. A 3D image of the patient P is to be registered with the patient P. Registering the 3D image of the patient with the patient P in this exemplary embodiment means to modify the 3D image of the patient P, wherein the 3D image represents at least a part of the surface of the patient P, with the actual patient P, that is the surface of the patient P. In a registration based on a rigid fusion, only the six parameters of a virtual position of the 3D image are determined such that the 3D image matches the patient P as good as possible. In a registration based on an elastic fusion, an additional modification of the shape of the 3D image is performed.

In the present exemplary embodiment, the patient P rests on an operating room table 4 which carries a reference marker R. The reference marker R defines a reference co-ordinate system in which spatial locations of points on the surface of the patient P are sampled and in which the 3D image of the patient P is aligned with the sampled surface points, and is thus registered with the patient P.

In the scenario shown in FIG. 1, a robot 1 is attached to the OR table 4. The robot holds a surface point sampling device 2, which in turn bears a marker M rigidly attached thereto. A stereoscopic camera 3 of a medical tracking system images the marker M and the reference marker R and determines the positions of those markers in a reference system associated with the camera 3. The position of the marker M in the reference system of the camera 3 can then be transformed into a position in the reference system associated with the reference marker R.

It shall be noted that other constellations are possible. The registration of the patient P with a 3D image of the patient P can also be performed in the reference system of the camera 3. In this case, the reference marker R can be omitted. However, a marker can be attached to the patient P such that a movement of the patient P relative to the camera 3 can be detected and compensated when sampling the surface points. An additional marker attached to the patient can also be used in the configuration as shown in FIG. 1.

In the present exemplary embodiment, the surface point sampling device 2 is of the contactless type. It basically comprises a laser beam source and generates a laser beam with a known orientation relative to the marker M. When the laser beam hits the patient P, it generates a laser spot on the surface of the patient P. The stereoscopic camera images the laser spot and calculates the spatial location of the laser spot in its own reference system. This spatial location is then transformed into a spatial location in the co-ordinate system of the reference marker R.

It shall be noted that the surface point sampling device can also be of the contact type. Such a surface point sampling device comprises a contact surface, such as a tip, which is to contact the surface of the patient P. The location of the contact surface of the surface point sampling device 2 relative to the marker M is known, such that the location of the contact surface, and therefore the sampled point on the surface of the patient P, can be determined from the position of the marker M. The contact between the contact surface and the surface of the patient P can for example be determined automatically, for example using a pressure sensor in the surface point sampling device or the robot 1, or be indicated manually by a user.

Figure 2:
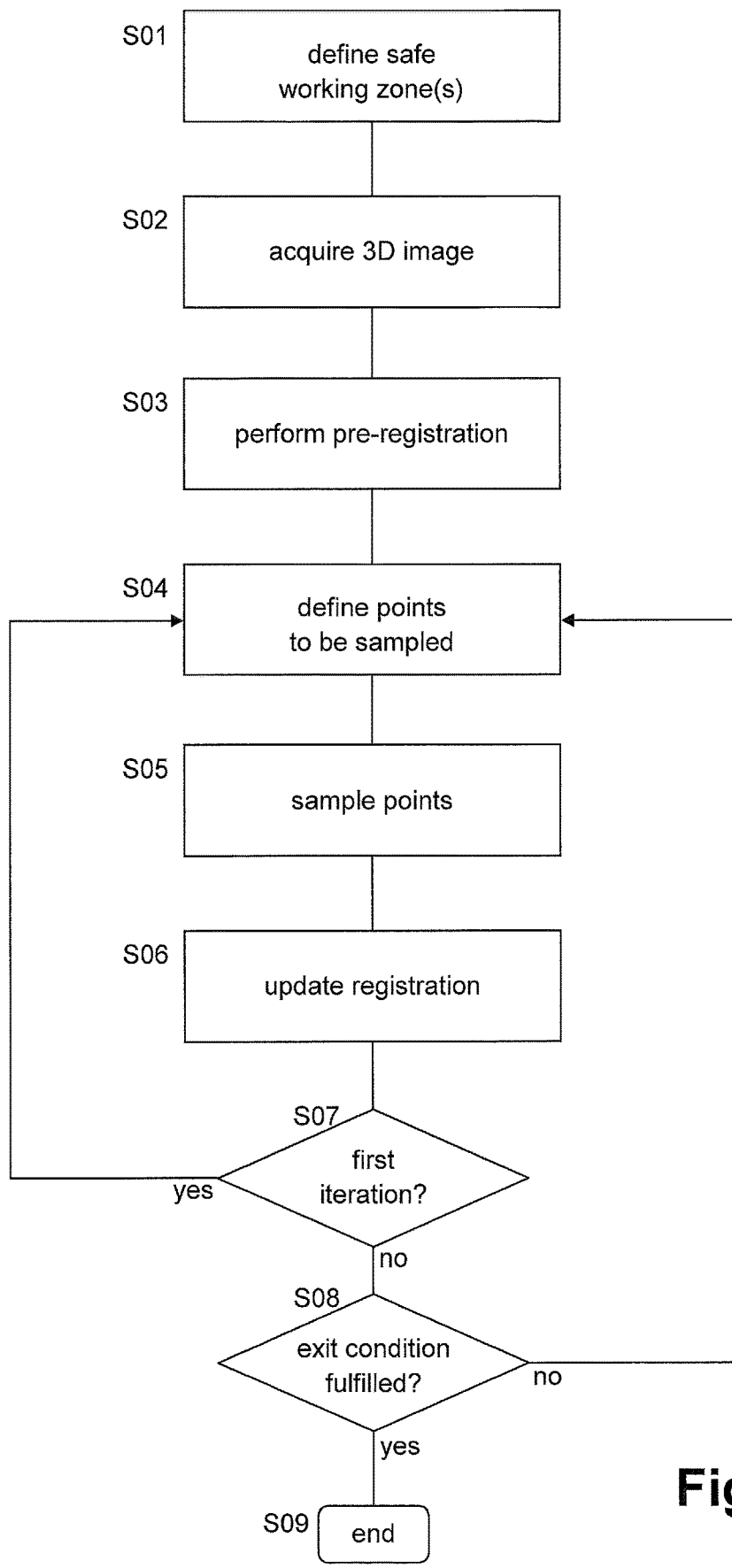
FIG. 2 a workflow for registering the patient.

FIG. 2 shows a flowchart of a workflow for registering the patient P. The workflow starts with the optional step S01 of defining one or more safe working zones of the robot 1. A safe working zone is a spatial area in which the robot 1 can move without colliding with an object or a person.

The workflow then proceeds to step S02 of acquiring a 3D image of the patient P. The 3D image of the patient P represents at least a part of the surface of the patient P.

The workflow then proceeds to step S03 of performing a pre-registration of the 3D image of the patient P with the patient P. Any suitable technique may be employed for performing the pre-registration, such as matching certain points, such as landmarks identified in the 3D image and a stereoscopic image of the patient P captured by the camera 3. In another approach, the pre-registration is based on a fusion of the 3D image of the patient P to a set of sampled points on the surface of the patient P. Those sampled surface points can be sampled by use of the robot 1 or manually by a user who operates a surface point sampling device, such as the surface point sampling device 2, which can be attached to the robot 1 afterwards.

The pre-registration of step S03 is then used as an initial registration for the first iteration of the workflow.

The workflow then proceeds to step S04 of defining points on the surface of the patient P to be sampled. Due to the pre-registration of step S03, the approximate topography of the surface of the patient P is known, for example in the reference system of the reference marker R or of the camera 3. The approximate topography of the surface of the patient P can be used to plan the surface points to be sampled. Criteria for defining the points to be sampled can be at least one of maximizing the distances to previously sampled surface points, selecting a point at a location that has a high curvature of the surface or is a saddle point of the surface.

In addition, a point can be selected which is unobstructed by objects such as draping, tubing etc.

In addition or as an alternative, an optional step S03a between steps S03 and S04 involves registering an atlas with the patient P and extracting the points to be sampled from the registered atlas.

S04 might involve trajectory planning, which means to plan, and in particular optimize, the order in which the surface points are to be sampled. In one example, each surface point to be sampled is assigned a corresponding sampling position of the surface point sampling device 2, and the planned trajectory represents an order of the sampling positions.

The workflow proceeds from step S04 to step S05 of sampling surface points on the surface of the patient P according to the points to be sampled as defined in step S04.

In step S05, the robot 1 subsequently moves the surface point sampling device 2 into a plurality of sampling positions, each corresponding to a surface point to be sampled. Once the surface point sampling device 2 is in a sampling position, the corresponding surface point is sampled. It shall be noted that it is not necessary that the robot 1 stops the surface point sampling device 2 at the sampling position. It is for example sufficient that the speed of the surface point sampling device 2 at the sampling position is below a predetermined threshold.

The workflow then proceeds to step S06 of updating the previous registration according to the surface points sampled in step S05.

The workflow then proceeds to step S07 of determining whether or not the workflow is in the first iteration. If this is the case, the workflow returns to step S04. This means that steps S04, S05 and S06 are performed at least twice. If the workflow is not in the first iteration, the workflow proceeds to step S08 of determining whether or not an exit condition is fulfilled. If this is not the case, the workflow returns to step S04. If this is the case, the workflow ends at step S09.

The exit condition can be at least one of a time span used for sampling surface points, the total number of sampled surface points, the accuracy of the registration or the registration confidence.

A plurality of different approaches might be implemented for updating the registration in step S06. In one implementation, a completely new registration is calculated based on the spatial locations of all sampled points which were sampled in all iterations of the workflow. In another implementation, the registration after the previous iteration (or the initial registration) is amended based on the spatial locations of the sampled points which were sampled in the current iteration of the workflow.

It shall be noted that the robot is not necessarily attached to the operation room table 4, but could also be attached to a wall or the ceiling of the operating room or for example be attached to a fixed or moveable base.

Figure 3:
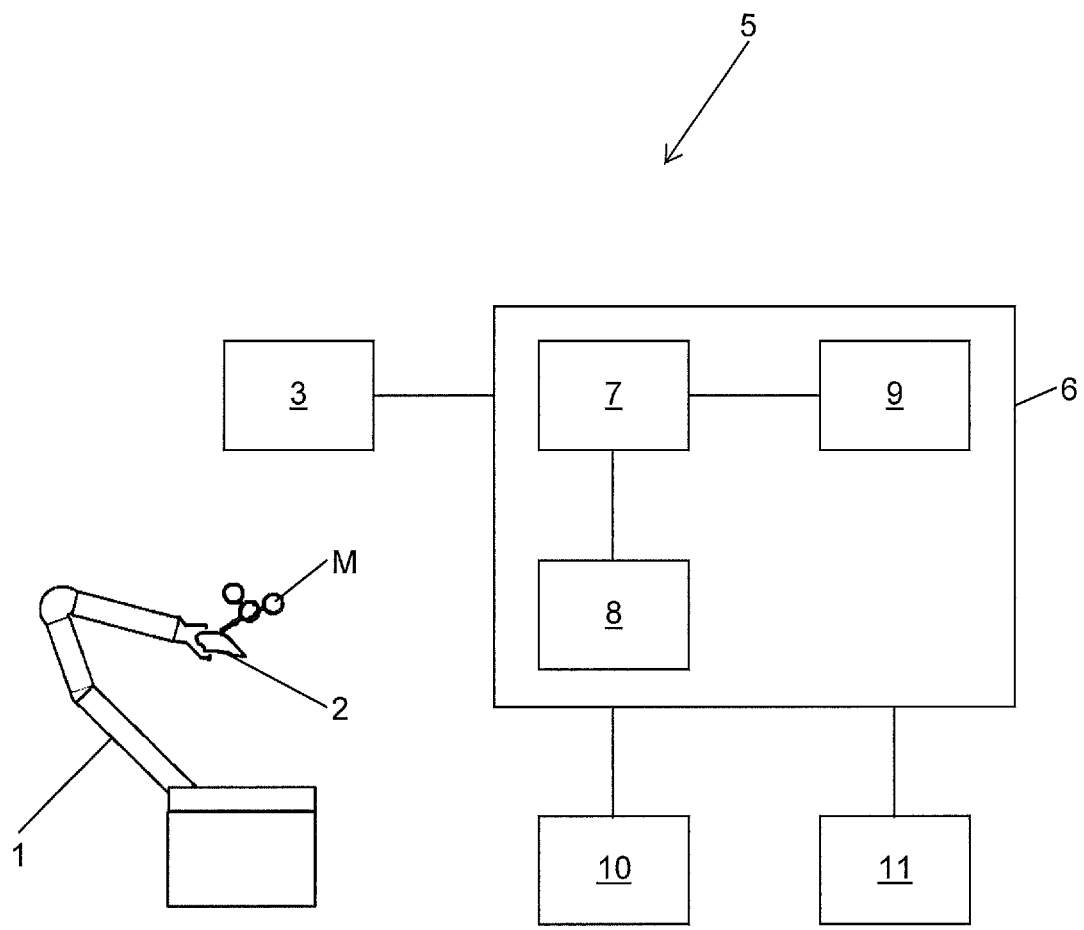
FIG. 3 a registration system.

FIG. 3 shows a medical registration system 5 for obtaining a registration of a 3D image of the patient P with the patient P. The medical registration system 5 comprises the robot 1 holding the surface point sampling device 2, the stereoscopic camera 3 and a computer 6.

The computer 6 comprises a central processing unit 7, an interface 8 and a memory 9. The memory 9 stores working data, such as spatial locations of sampled points, the 3D image and the registration. It further stores instructions which let the central processing unit 7 implement the method or the workflow described herein.

The computer 6 is connected to the stereoscopic camera 3, an input device 10, such as a mouse, a keyboard or a touch sensitive surface, and to an output device 11, such as a display or monitor. The connection between the computer 6 and at least one of the camera 3, the input device 10 or the output device 11 is implemented via the interface 8.

The invention claimed is:

1. A method of operating a medical registration system, the medical registration system comprising a robot which carries a surface point sampling device and including a computer connected to the robot, to obtain a registration of a 3D image of a patient with the patient by:
acquiring the 3D image of the patient;
acquiring an initial registration of the 3D image with the patient as the registration;
sampling by the robot the spatial locations of N different points on the surface of the patient using the surface point sampling device, wherein N is a positive integer;
updating the registration based on the spatial locations of the N sampled points; and
repeating the sampling and the updating steps until a predetermined exit condition is fulfilled.

2. The method of claim 1, wherein the predetermined exit condition is at least one of a time lapse, the total number of sampled surface points, the accuracy of the registration or the registration confidence.

3. The method of claim 1, wherein the sampling by the robot includes for each of the N different points, instructing the robot to move the surface point sampling device into a sampling position and instructing the surface point sampling device to sample a surface point.

4. The method of claim 3, wherein sampling a surface point involves determining the distance from the sampled surface point to the surface point sampling device and calculating the spatial location of the surface point from said distance and the sampling position of the surface point sampling device.

5. The method of claim 3, wherein the sampling position is a position in which at least one of the distance or the orientation between the surface point sampling device and the surface of the patient is within a predetermined range.

6. The method of claim 3, wherein the sampling position is a position in which a marker device attached to the robot or the surface point sampling device is within a predetermined range relative to a medical tracking system.

7. The method of claim 1, wherein sampling a surface point involves moving, by the robot, the surface point sampling device towards the surface of the patient until it is in contact therewith.

8. The method of claim 1, wherein a surface point to be sampled is determined based on the registered 3D image or a registered atlas.

9. The method of claim 8, wherein a surface point to be sampled is determined based on a registered atlas and the atlas defines the number of points to be sampled in a predefined area of the surface.

10. The method of claim 1, wherein a surface point to be sampled is a point in an area of the surface with a high curvature or comprising a saddle point.

11. The method of claim 1, wherein a surface point to be sampled is a point with a maximum distance to the other surface points sampled so far.

12. The method of claim 1, wherein a surface point to be sampled is determined based on a co-registered optical image of the patient.

13. The method of claim 1, wherein the surface points to be sampled are selected such that the robot remains in one or more safe working areas.

14. A non-transitory computer readable storage medium having instructions for operating a medical registration system, the medical registration system including a robot which carries a surface point sampling device and a computer having at least one processor connected to the robot, to obtain a registration of a 3D image of a patient with the patient, the instructions comprising:
acquiring the 3D image of the patient;
acquiring an initial registration of the 3D image with the patient as the registration;
instructing the robot to sample the spatial locations of N different points on the surface of the patient using the surface point sampling device, wherein N is a positive integer;
updating the registration based on the spatial locations of the N sampled points; and repeating the instructing the robot to sample the spatial locations and the updating steps until a predetermined exit condition is fulfilled.

15. A medical registration system comprising a computer having at least one processor, the computer connected to a robot which carries a surface point sampling device to obtain a registration of a 3D image of a patient with the patient, the computer having instructions to perform the steps comprising:

acquiring the 3D image of the patient;

acquiring an initial registration of the 3D image with the patient as the registration;

sampling by the robot the spatial locations of N different points on the surface of the patient using the surface point sampling device, wherein N is a positive integer;

updating the registration based on the spatial locations of the N sampled points; and repeating the sampling and the updating steps until a predetermined exit condition is fulfilled.

* * * * *

UNITED STATES PATENT AND TRADEMARK OFFICE
CERTIFICATE OF CORRECTION

PATENT NO. : 10,621,736 B2
APPLICATION NO. : 16/073137
DATED : April 14, 2020
INVENTOR(S) : Wolfgang Steinle, Christoffer Hamilton and Nils Frielinghaus It is certified that error appears in the above-identified patent and that said Letters Patent is hereby corrected as shown below:

In the Specification

In Column 4, Line 55, delete "teams" and insert -- terms --, therefor.

In Column 8, Line 32, delete "fonii" and insert -- form --, therefor.

In Column 12, Line 51, delete "perfotined" and insert -- performed --, therefor.

Signed and Sealed this
Twenty-eighth Day of July, 2020

Andrei Iancu
*Director of the United States Patent and Trademark Office*